(12) United States Patent
Young

(10) Patent No.: US 9,975,075 B1
(45) Date of Patent: May 22, 2018

(54) DUMPSTER FILTRATION SYSTEM

(71) Applicant: Allen Young, Marlborough, MA (US)

(72) Inventor: Allen Young, Marlborough, MA (US)

( * ) Notice: Subject to any disclaimer, the term of this patent is extended or adjusted under 35 U.S.C. 154(b) by 136 days.

(21) Appl. No.: 15/090,793

(22) Filed: Apr. 5, 2016

(51) Int. Cl.
*B01D 46/10* (2006.01)
*B01D 46/12* (2006.01)
*B01D 46/42* (2006.01)
*B01D 46/00* (2006.01)
*B65F 1/14* (2006.01)

(52) U.S. Cl.
CPC ..... *B01D 46/0041* (2013.01); *B01D 46/0023* (2013.01); *B65F 1/14* (2013.01)

(58) Field of Classification Search
CPC ........ B01D 46/10; B01D 46/12; B01D 46/42; B01D 46/0024; B01D 2275/305; B01D 2273/28; Y10S 160/08
USPC ........... 55/385.1, 385.2, 419, 467, 487, 356; 95/284; 49/68; 312/1, 3; 454/251; 160/332, DIG. 8
See application file for complete search history.

(56) References Cited

U.S. PATENT DOCUMENTS

| | | | |
|---|---|---|---|
| 4,162,149 A | 7/1979 | Mekelburg | |
| 4,604,111 A * | 8/1986 | Natale | B01D 46/0024 160/332 |
| 5,702,493 A * | 12/1997 | Everetts | B01D 46/0006 454/63 |
| 5,775,979 A | 7/1998 | Coke | |
| 5,951,725 A * | 9/1999 | Vross | B01D 46/00 126/343.5 A |
| 6,395,047 B1 * | 5/2002 | Smith | B08B 15/002 454/187 |
| 6,444,003 B1 | 9/2002 | Sutcliffe | |
| 6,752,467 B1 | 6/2004 | Palrose | |
| 6,814,249 B2 | 11/2004 | Lin | |
| 7,878,359 B1 | 2/2011 | Ko | |
| D641,377 S | 7/2011 | Luxon | |
| 2005/0229555 A1 * | 10/2005 | Montgomery | A61M 1/008 55/356 |
| 2015/0000232 A1 * | 1/2015 | Hammers | B01D 49/00 55/385.1 |

FOREIGN PATENT DOCUMENTS

WO WO2013013312 A1 1/2013

* cited by examiner

*Primary Examiner* — Christopher P Jones
*Assistant Examiner* — Minh-Chau Pham
(74) *Attorney, Agent, or Firm* — Kyle A. Fletcher, Esq.

(57) ABSTRACT

The dumpster filtration system is an air filtration system that removes dust and other particles from a dumpster. The dumpster filtration system uses a fan placed externally to the dumpster that generates uses negative air pressure to draw dust and other particles through a gooseneck hose. The gooseneck hose routes air from the dumpster through a HEPA filter which removes dust and other particles from the air before it is ejected from the system. The dumpster filtration system comprises a gooseneck hose and a HEPA filtration system.

9 Claims, 5 Drawing Sheets

DUMPSTER FILTRATION SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of separation technologies, more specifically, a filtering device adapted for use with dumpsters.

SUMMARY OF INVENTION

The dumpster filtration system is an air filtration system that removes dust and other particles from a dumpster. The dumpster filtration system uses a fan placed externally to the dumpster that generates uses negative air pressure to draw dust and other particles through a gooseneck hose. The gooseneck hose routes air from the dumpster through a HEPA filter which removes dust and other particles from the air before it is ejected from the system.

These together with additional objects, features and advantages of the dumpster filtration system will be readily apparent to those of ordinary skill in the art upon reading the following detailed description of the presently preferred, but nonetheless illustrative, embodiments when taken in conjunction with the accompanying drawings.

In this respect, before explaining the current embodiments of the dumpster filtration system in detail, it is to be understood that the dumpster filtration system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the dumpster filtration system.

It is therefore important that the claims be regarded as including such equivalent construction insofar as they do not depart from the spirit and scope of the dumpster filtration system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
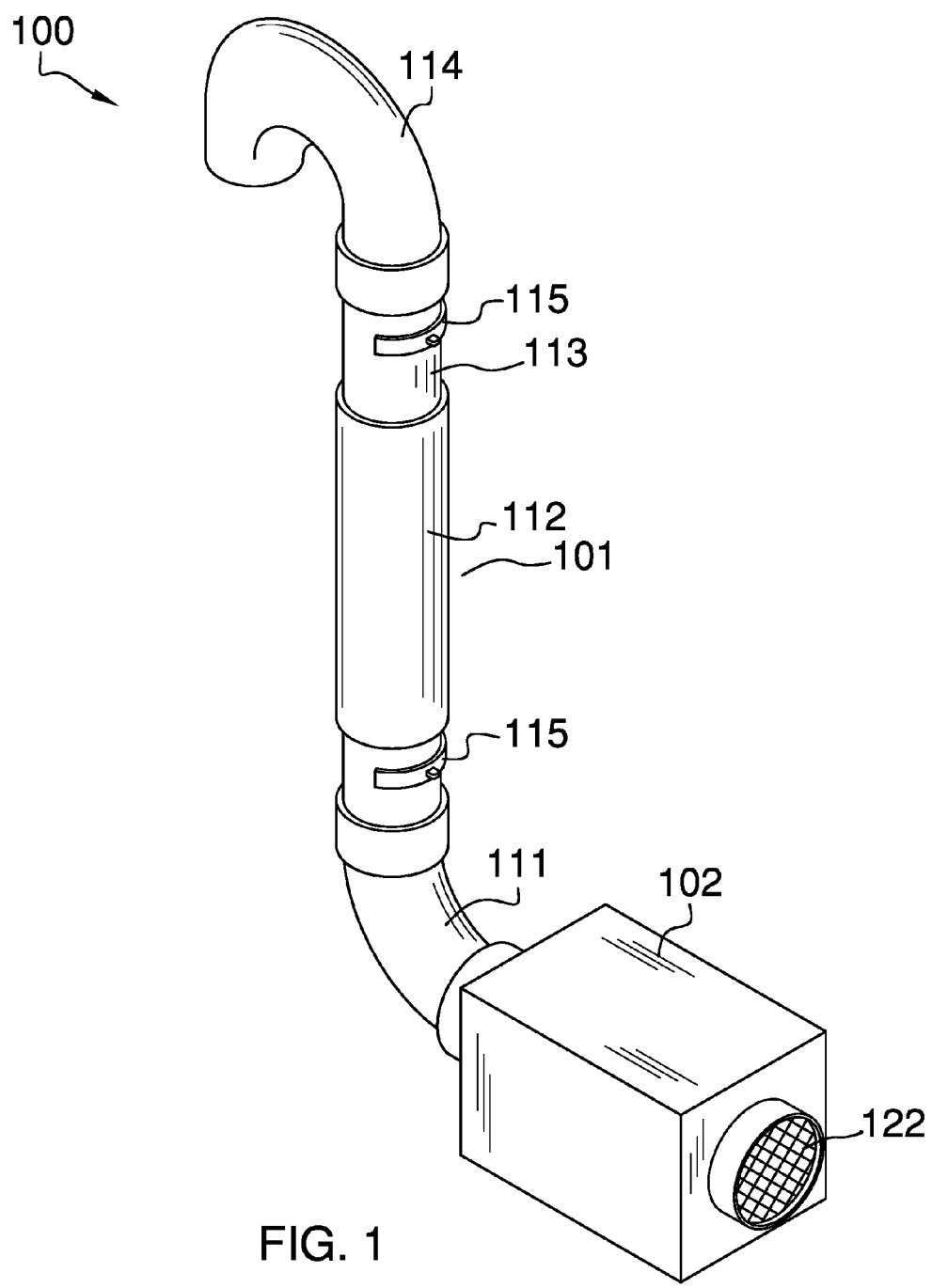
FIG. 1 is a perspective view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to a first potential embodiment of the disclosure, which is illustrated in FIGS. 1 through 5.

The dumpster filtration system 100 (hereinafter invention) comprises a gooseneck hose 101 and a HEPA filtration system 102. The invention 100 is adapted for use with a lidded 132 dumpster 131 that is traditionally used for waste or refuse collection. The invention 100 uses negative air pressure to evacuate air from the lidded 132 dumpster 131 removing with it dust and other particulates that are filtered from the evacuated air before being ejected from the invention 100. The dumpster 131 lid 132 is required to be closed in order to maintain the necessary negative air pressure within the dumpster 131 in order for the dumpster 131 to work.

The HEPA filtration system 102 is a readily and commercially available whole house air filtration system with a capacity of at least 240 cubic feet per minute. As described in the prior sentence, the HEPA filtrations system 102 is designed to be incorporated into a household HVAC system and is designed to work with commonly available ductwork. The HEPA filtration system 102 will require externally provided electricity 123 to operate. The HEPA filtration system 102 further comprises an intake port 121, and an exhaust port 122. The HEPA filtration system 102 selected is sized such that it can be moved between dumpsters 131.

The gooseneck hose 101 draws air from the dumpster 131 to the HEPA filtration system 102. The gooseneck hose 101 comprises an elbow 111, an outer tube 112, an inner tube 113, a flexible duct 114, and one or more optional prefilters 115. The elbow 111 is further defined with a first end 141 and a second end 142. The outer tube 112 is further defined with a third end 143 and a fourth end 144. The inner tube 113 is further defined with a fifth end 145 and a sixth end 146. The flexible duct 114 is further defined with a seventh end 147 and an eighth end 148. The outer tube 112 and the inner tube 113 are configured in a telescopic manner. Specifically, the inner diameter of the outer tube 112 is greater than the outer diameter of the inner tube 113. This allows the inner tube 113 to be inserted into and slide freely within the outer tube 112. By adjusting the relative position of the inner tube 113 to the outer tube 112 the height of the gooseneck hose 101 can be adjusted to the height of the dumpster 131. Once the proper relative positioning of the inner tube 113 and the outer tube 112 is set, the relative position can be locked in using a commercially available clamp or collar 116. The flexible duct 114 is readily and commercially available flexible polyester ductwork. The elbow 111, the outer tube 112, and the inner tube 113 are commercially available ducts or duct connectors.

Figure 2:
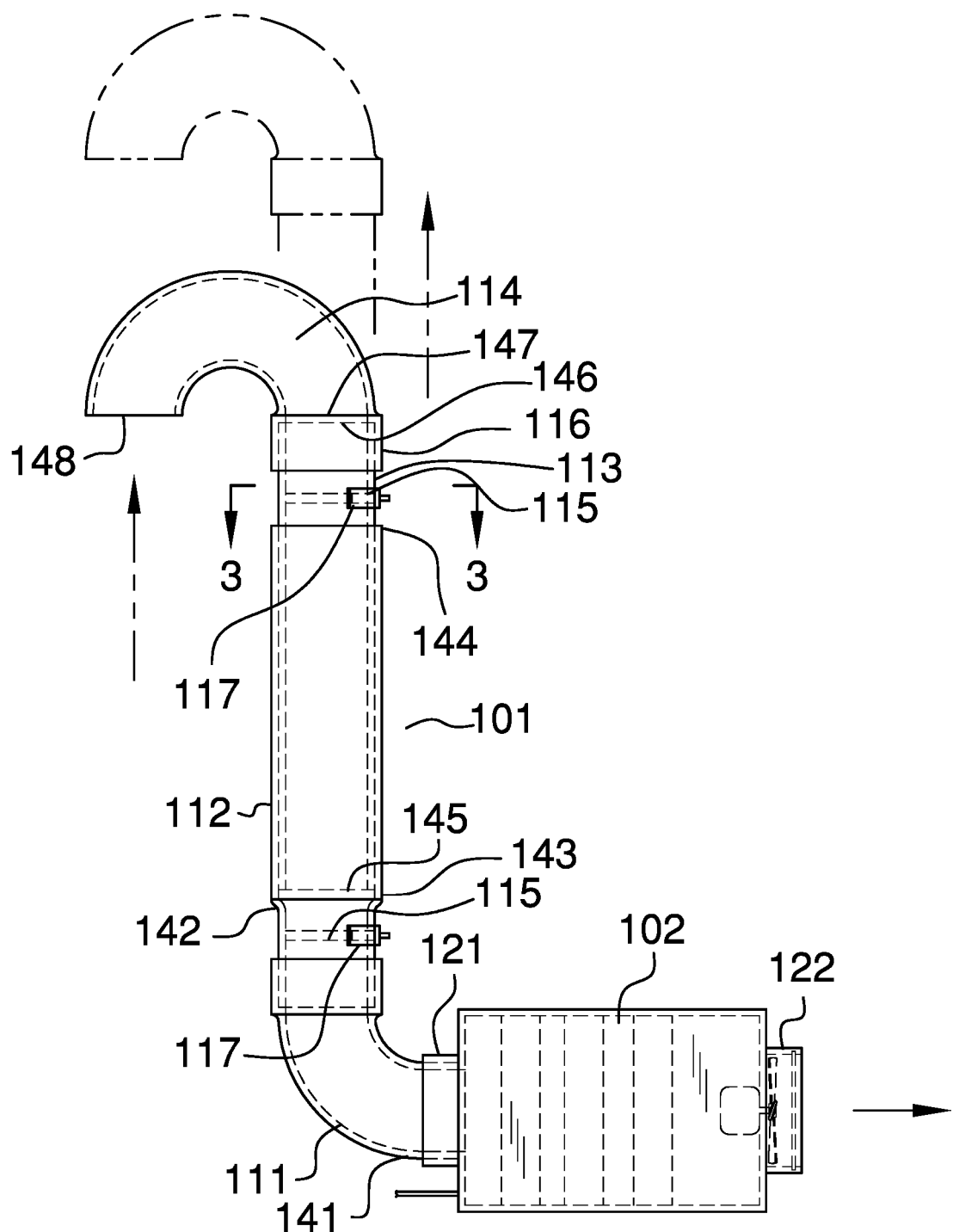
FIG. 2 is a side view of an embodiment of the disclosure.
Figure 3:
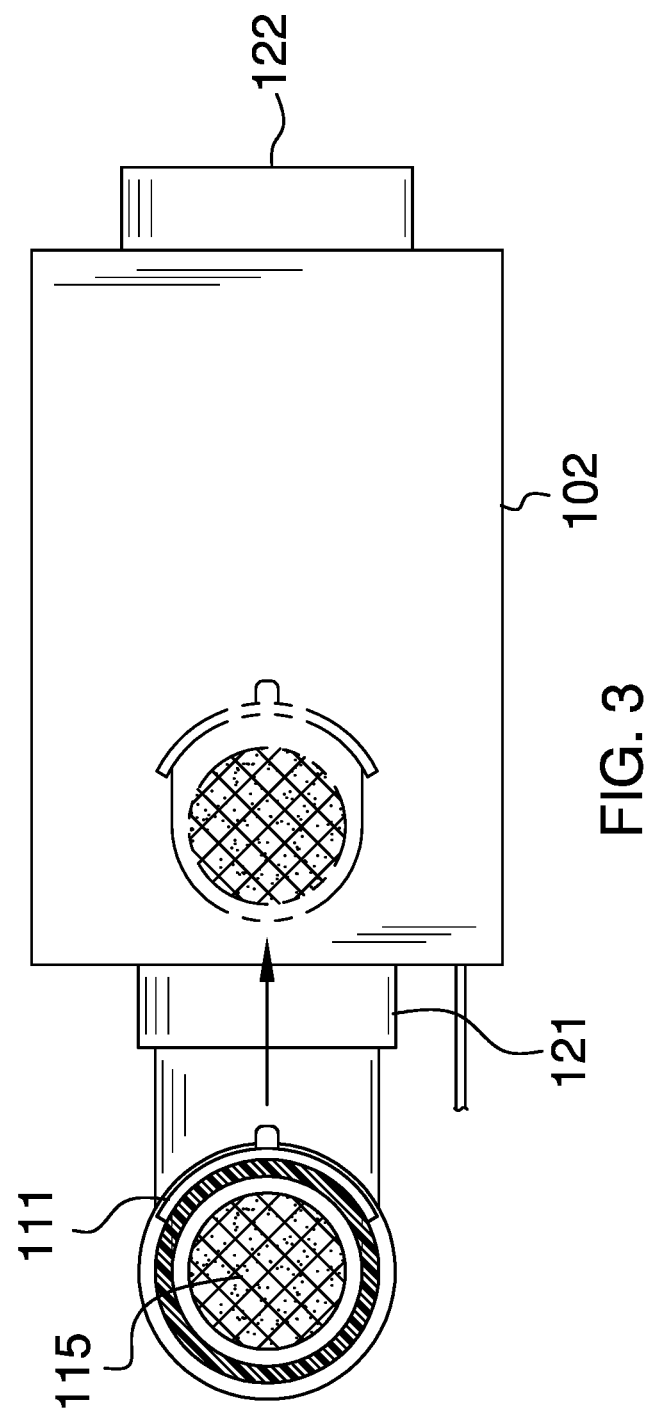
FIG. 3 is a detail view of an embodiment of the disclosure.
Figure 4:
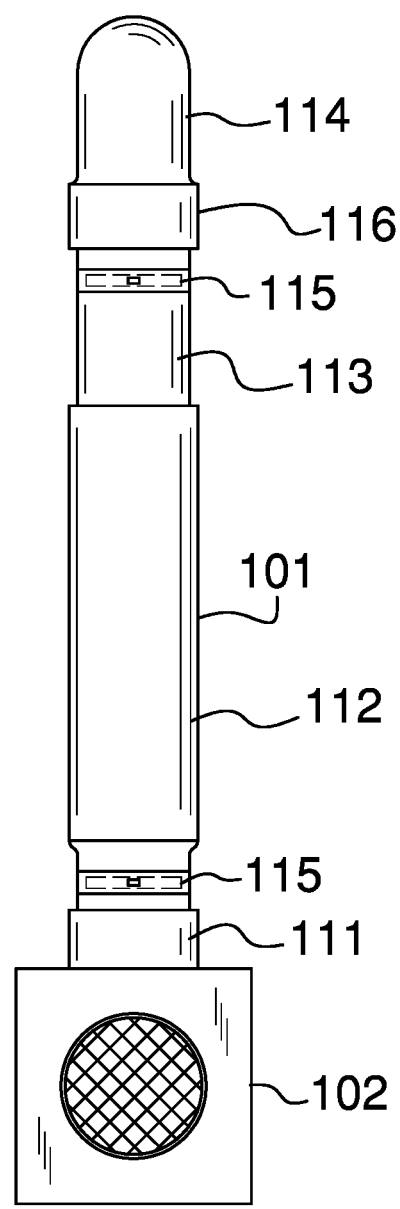
FIG. 4 is a front view of an embodiment of the disclosure.
Figure 5:
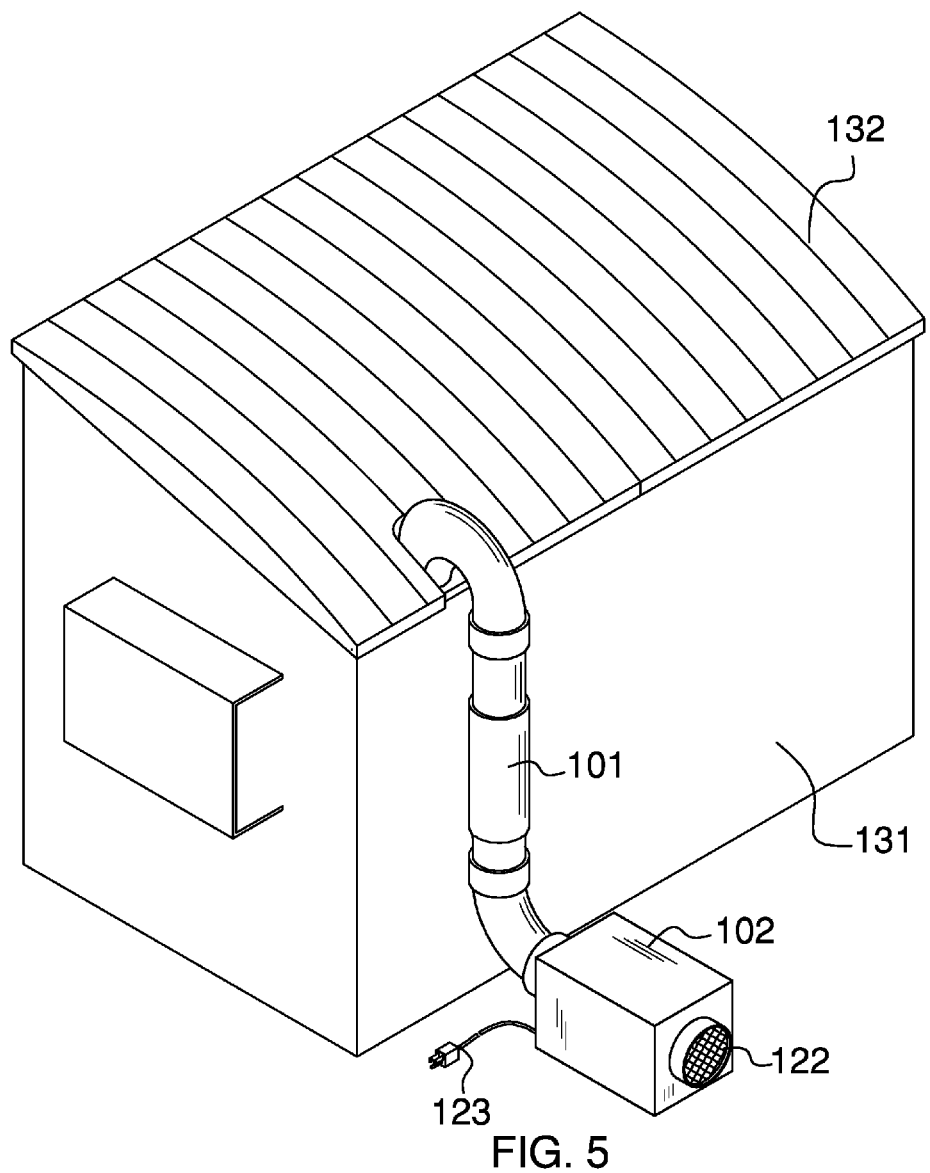
FIG. 5 is a in-use view of an embodiment of the disclosure.

As shown most clearly in FIG. 2, the first end 141 of the elbow 111 attaches to the to the intake port 121 of the HEPA filtration system 102. The second end 142 of the elbow attaches to the third end 143 of the outer tube 112. The fifth end 145 of the inner tube 113 inserts into the fourth end 144 of the outer tube 112. The sixth end 146 of the inner tube 113 attaches to the seventh end 147 of the flexible duct 114. The eighth end 148 of the flexible duct 114 is inserted into the dumpster 131.

In some applications, a hole 133 may need to be cut into the lid 132 of the dumpster 131 in order to insert the flexible duct 114 into the dumpster 131.

In a second potential embodiment of the disclosure, one or more prefilters 115 are inserted into the gooseneck hose 101 in order to improve the filtering efficiency of the invention 100. In this second embodiment, custom duct connectors 117 are built. Each of the custom duct connectors 117 includes a housing into which a filter placed. The custom duct connectors 117 can be placed between the second end 142 and the third end 143. Alternatively the custom duct connector 117 can be mounted in the fifth end 145 of the inner tube 113.

To use the invention 100, the eighth end 148 of the flexible duct 114 is placed into the dumpster 131 and the lid 132 of the dumpster 131 is closed. The HEPA filtrations system 102 is turned on.

The following definitions were used in this disclosure:

HEPA: As used in this disclosure, a HEPA filter is a filter that meets standards set by the United States Department of Energy. The HEPA standard defines several classes of filters that are primarily differentiated by the percentage of 0.3 micrometer particles that the filter will remove from the air that passes through the filter. HEPA is an acronym that stands for high efficiency particulate arrestor.

Inner Diameter: As used in this disclosure, the term inner diameter is used in the same way that a plumber would refer to the inner diameter of a pipe.

Outer Diameter: As used in this disclosure, the term outer diameter is used in the same way that a plumber would refer to the outer diameter of a pipe.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A filtration system comprising:
a gooseneck hose and a HEPA filtration system;
wherein the filtration system is for use in removing dust and other particulates from dumpsters;
wherein the filtration system uses negative air pressure to remove dust and other particulates from dumpsters;
wherein the filtration system is portable;
wherein the filtration system the gooseneck hose is telescopic;
wherein the gooseneck hose draws air from the dumpster to the HEPA filtration system;
wherein the gooseneck hose comprises an elbow, an outer tube, an inner tube, and a flexible duct;
wherein the elbow is further defined with a first end and a second end;
wherein the outer tube is further defined with a third end and a fourth end;
wherein the inner tube is further defined with a fifth end and a sixth end;
wherein the flexible duct is further defined with a seventh end and an eighth end;
wherein the position of the inner tube relative to the outer tube is adjustable;
wherein the relative position of the inner tube to the outer tube is locked using a collar;
wherein the HEPA filtration system further comprises an intake port and an exhaust port;
wherein the first end of the elbow attaches to the to the intake port of the HEPA filtration system;
wherein the second end of the elbow attaches to the third end of the outer tube;
wherein the fifth end of the inner tube inserts into the fourth end of the outer tube;
wherein the sixth end of the inner tube attaches to the seventh end of the flexible duct;
wherein the eighth end of the flexible duct is inserted into the dumpster.

2. The filtration system according to claim 1 wherein the gooseneck hose further comprises one or more prefilters.

3. The filtration system according to claim 2 wherein each of the one or more prefilters comprises custom duct connector and a filter.

4. The filtration system according to claim 3 wherein a prefilter selected from the one or more prefilters is placed between the second end and the third end.

5. The filtration system according to claim 3 wherein a prefilter selected from the one or more prefilters is mounted within the fifth end of the inner tube.

6. The filtration system according to claim 5 wherein a prefilter selected from the one or more prefilters is placed between the second end and the third end.

7. The filtration system according to claim 6 wherein the HEPA filtration system processes a minimum of 239 cubic feet per minute.

8. The filtration system according to claim 4 wherein the HEPA filtration system processes a minimum of 239 cubic feet per minute.

9. The filtration system according to claim 3 wherein the HEPA filtration system processes a minimum of 239 cubic feet per minute.

* * * * *